(12) United States Patent
Saijo et al.

(10) Patent No.: US 10,306,347 B2
(45) Date of Patent: May 28, 2019

(54) AUDIO REPRODUCTION DEVICE

(71) Applicant: SONY CORPORATION, Tokyo (JP)

(72) Inventors: Nobuhiro Saijo, Tokyo (JP); Satoshi Akagawa, Tokyo (JP); Hiroshi Sato, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/691,851

(22) Filed: Aug. 31, 2017

(65) Prior Publication Data
US 2017/0366887 A1 Dec. 21, 2017

Related U.S. Application Data

(63) Continuation of application No. 14/654,481, filed as application No. PCT/JP2013/006280 on Oct. 24, 2013, now Pat. No. 9,832,555.

(30) Foreign Application Priority Data

Dec. 28, 2012 (JP) ................................ 2012-287541

(51) Int. Cl.
*H04R 1/08* (2006.01)
*H04R 1/02* (2006.01)
(Continued)

(52) U.S. Cl.
CPC ......... *H04R 1/028* (2013.01); *F21V 23/0442* (2013.01); *G10H 1/40* (2013.01);
(Continued)

(58) Field of Classification Search
CPC . H04R 1/08; H04R 9/08; H04R 11/04; H04R 17/02; H04R 21/02; H04R 1/02; H04R 1/025; H04R 1/026; H04R 9/00
(Continued)

(56) References Cited

U.S. PATENT DOCUMENTS

2002/0154787 A1 10/2002 Rice et al.
2003/0016838 A1 1/2003 Paritsky et al.
(Continued)

FOREIGN PATENT DOCUMENTS

JP 63-33414 Y2 9/1988
JP 2001-067053 A 3/2001
(Continued)

OTHER PUBLICATIONS

Notice of Allowance for U.S. Appl. No. 14/654,481, dated Nov. 21, 2016, 07 pages.
(Continued)

*Primary Examiner* — Suhan Ni
(74) *Attorney, Agent, or Firm* — Chip Law Group

(57) ABSTRACT

Provided is a sound reproduction device including: speakers; light emitting elements provided to a part of each of the speakers, or in a vicinity of each of the speakers; a detecting section configured to detect a beat of an audio signal reproduced by the speakers, and output a detection signal corresponding to the beat; and a light emission control signal outputting section configured to output a light emission control signal for controlling a light emission mode of the light emitting elements according to the detection signal. The light emission control signal outputting section outputs a first light emission control signal according to the detection signal, and outputs a second light emission control signal when a period in which the beat is not detected exceeds a set period, the second light emission control signal being for controlling the light emitting elements to perform a predetermined light emission mode.

9 Claims, 13 Drawing Sheets

(51) Int. Cl.
| | |
|---|---|
| *F21V 23/04* | (2006.01) |
| *G11B 27/28* | (2006.01) |
| *G11B 27/34* | (2006.01) |
| *G10H 1/40* | (2006.01) |
| *H05B 33/08* | (2006.01) |
| *H05B 37/02* | (2006.01) |
| *F21V 33/00* | (2006.01) |
| *F21Y 101/00* | (2016.01) |
| *F21Y 115/10* | (2016.01) |

(52) U.S. Cl.
CPC .............. *G11B 27/28* (2013.01); *G11B 27/34* (2013.01); *H05B 33/086* (2013.01); *H05B 37/0236* (2013.01); *F21V 33/0056* (2013.01); *F21Y 2101/00* (2013.01); *F21Y 2115/10* (2016.08); *G10H 2220/081* (2013.01); *H04R 2201/403* (2013.01)

(58) Field of Classification Search
USPC .......................... 381/172, 369, 386, 394, 396
See application file for complete search history.

(56) References Cited

U.S. PATENT DOCUMENTS

| | | |
|---|---|---|
| 2003/0031330 A1 | 2/2003 | Kim |
| 2010/0280922 A1 | 11/2010 | Giovannotto |
| 2015/0201295 A1 | 7/2015 | Lau et al. |

FOREIGN PATENT DOCUMENTS

| | | |
|---|---|---|
| JP | 2004-282219 A | 10/2004 |
| JP | 4843120 B1 | 12/2011 |

OTHER PUBLICATIONS

Non Final Office Action for U.S. Appl. No. 14/654,481, dated Jan. 12, 2017, 07 pages.
Non Final Office Action for U.S. Appl. No. 14/654,481, dated Jul. 28, 2016, 05 pages.
Notice of Allowance for U.S. Appl. No. 14/654,481, dated Jul. 26, 2016, 05 pages.
International Search Report and Written Opinion of PCT Application No. PCT/JP2013/006280, dated Jan. 23, 2014, 08 pages of English Translation and 08 pages of ISRWO.
International Preliminary Report on Patentability of PCT Application No. PCT/JP2013/006280, dated Jul. 9, 2015, 37 pages of English Translation and 05 pages of IPRP.
Notice of Allowance for U.S. Appl. No. 14/654,481, dated Dec. 15, 2016, 05 pages.

AUDIO REPRODUCTION DEVICE

CROSS REFERENCE PARAGRAPH

The present application is a continuation application of U.S. patent application Ser. No. 14/654,481, filed Jun. 19, 2015, which is a National Stage of PCT/JP2013/006280, filed Oct. 24, 2013, and claims the benefit of priority from prior Japanese Patent Application JP 2012-287541, filed Dec. 28, 2012, the entire content of which is hereby incorporated by reference in its entirety.

TECHNICAL FIELD

The present disclosure relates to an audio reproduction device having a display function by means of light emitting elements.

BACKGROUND ART

It has been employed that various controls are performed in synchronism with reproduction of audio data. For example, Patent Literature 1 listed below describes an art in which light emission performed by a plurality of LEDs (Light Emitting Diodes) is controlled according to a feature of audio data to be reproduced.

Patent Literature 2 describes a device in which light emission performed by an LED matrix (pattern display section) is controlled by a display microcomputer according to a signal inputted.

Patent Literature 3 describes a sound-interlocked light source driver capable of expressing, by turning on or blinking, intensity of a sound of an audio signal, or a no-sound state in which no sound is reproduced.

Patent Literature 4 describes an art in which a backlight for an LCD and operation buttons of an in-vehicle audio device is controlled according to a reproduction audio signal. More specifically, a trigger signal is generated in case where the reproduction audio signal exceeds a predetermined threshold, and a light source color is changed according to the trigger signal.

CITATION LIST

Patent Literature

Patent Literature 1: JP 2004-501497T
Patent Literature 2: JP 2003-288054A
Patent Literature 3: JP 2004-282219A
Patent Literature 4: JP 2012-27227A

SUMMARY OF INVENTION

Technical Problem

The aforementioned related arts have such problems in that there is a period in which brightness of the light emission of the LEDs is kept dark thereby causing no brightness change, while the reproduced sound is weak or while no sound is reproduced, or in that the light emission of the LEDs is not changed in a period in which no sound change occurs. In such a case where the brightness of the LEDs is kept dark, or the light emission of the LEDs is not changed, synchronism between reproduced music and the display is interrupted temporally, thereby spoiling excitement of a listener, so that the music-display synchronization to change the display in synchronism with the music becomes less effective.

Therefore, a purpose of the present disclosure is to provide a sound reproduction device configured to perform music-interlocked display in which the display is changed according to music, and to change the display even when the music is low in volume or when the music is temporally interrupted, thereby being capable of preventing deterioration of effectiveness of the music-interlocked display even when the music is low in volume or when the music is temporally interrupted.

Solution to Problem

According to one embodiment of the present disclosure, there is provided a sound reproduction device including: a plurality of speakers; a plurality of light emitting elements provided to a part of each of the speakers, or in a vicinity of each of the speakers; a detecting section configured to detect a beat of an audio signal reproduced by the speakers, and output a detection signal corresponding to the beat; and a light emission control signal outputting section configured to output a light emission control signal for controlling a light emission mode of the light emitting elements according to the detection signal. The light emission control signal outputting section outputs a first light emission control signal according to the detection signal, and outputs a second light emission control signal when a period in which the beat is not detected exceeds a set period, the second light emission control signal being for controlling the light emitting elements to perform a predetermined light emission mode.

Advantageous Effects of Invention

According to at least one embodiment, it is possible that light emitting modes of a plurality of light emitting elements individually associated with a plurality of speakers are changed according to beats. Furthermore, it is possible that in case where the beats are not detected for a predetermined length of time, the plurality of light emitting elements are caused to emit light in a routine light emitting mode. For example, when songs are reproduced sequentially, this makes it possible to prevent the display from being blank between the songs. This can prevent spoiling excitement of a listener. It should be noted that the effects the present technology may have are not limited to the effects described herein and may be any effects described in the present disclosure.

DESCRIPTION OF EMBODIMENTS

In the following, one embodiment of the present disclosure is explained referring to drawings. The explanation is carried out in the following order.

1. One Embodiment

2. Modifications

It should be noted that the embodiments described below are merely to exemplify preferable and specific examples of the present disclosure and described with various technical preferable limitations, and shall not be interpreted such that the scope of the present disclosure is not limited to any of these embodiments, unless it is stated that the present disclosure is limited thereto in the following description.

1. One Embodiment

"Configuration of Sound Reproduction Device"

Figure 1:
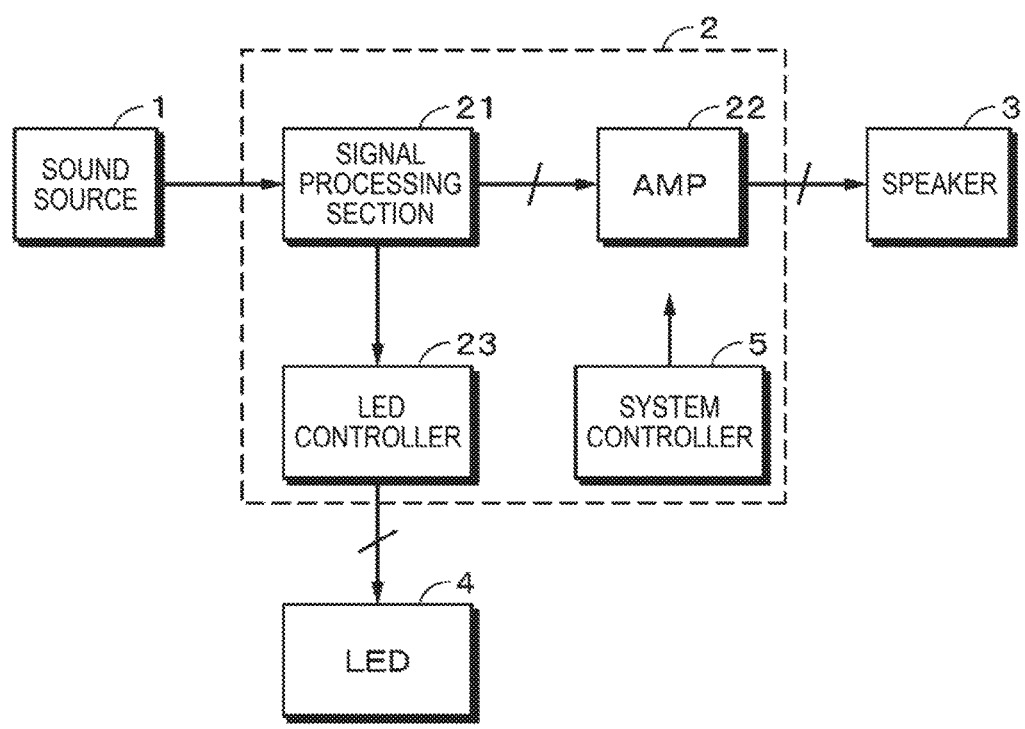
FIG. 1 is a block diagram illustrating an exemplary configuration according to one embodiment of the present disclosure.

FIG. 1 illustrates one exemplary configuration of a sound reproduction device according to one embodiment of the present disclosure. This embodiment relates to a floor-standing type sound reproduction device including: a sound source 1; a control unit 2; a plurality of speakers 3, which include 6 speakers for instance; and a plurality of light emitting elements, which are for example, LEDs 4, and which include 6 LEDs for instance.

The sound source 1 is for signals such as a digital audio signal stored in an USB (Universal Serial Bus) memory, an audio signal reproduced from a disc type recording medium such as a CD (compact disc), a broadcast audio signal received via a tuner, or the like. A digital audio signal from the sound source 1 is supplied to a signal processing section 21 of the control unit 2. The signal processing section 21 is configured to output analog audio signals of a plurality of channels, which are supplied to the speakers 3 via an amplifier 22 and is outputted from the speakers 3 as sound.

The signal processing section 21 may be a DSP (Digital Signal Processor), for example. The signal processing section 21 is configured to, for example, perform decoding process for compressed audio data. As a process relating to one embodiment of the present disclosure, the signal processing section 21 has a music analyzing function, which is a function to detect beats of the digital audio signal supplied from the sound source, and output a beat detection signal synchronized with timing of the beats. For example, the music analyzing function is configured to carry out frequency analysis of the audio data by Fourier analysis, so as to extract a low frequency component and detect a beat from a gain of the low frequency component. The beats may be detected by another method, for example, by twelve-tone analysis method. The term "beats", which are typically bass beats, is used synonymously with rhythm and pulse in the present disclosure.

The beat detection signal thus generated by the signal processing section 21 is supplied to an LED controller 23 as a trigger signal. The LED controller 23 is configured to generate, according to the beat detection signal, a light emission control signal for controlling timing at which the LEDs 4 emit light or not, and for controlling brightness of the light emission performed by the LEDs 4. The LED controller 23 is provided with a rewritable non-volatile memory, in which first and second light emission control signals for controlling light emission pattern of the LEDs 4 are stored.

Beat intervals are various in length depending on kinds of music, so that there are some cases that no beats are detected for a relatively long period. Furthermore, no beats are detected in a song-interval period in which a song is switched to the other song. For some kinds of music, a gain of low sound component is low, thereby resulting in such a case that no beats are detected for a relatively long period. If no light emission is performed by the LEDs 4 in these cases, there would be a long period in which no decorative display is provided to a user at all, thereby spoiling or eliminating excitement or a sense of exaltation obtained by display. This problem is significant especially in case where the sound reproduction device is used in a dark room.

In view of these points, it is configured to generate the second light emission control signal for controlling the light emission pattern of the LEDs 4 when the period in which no beats are detected exceeds a predetermined length of time, apart from the first light emission control signal for controlling the light emission pattern of the LEDs 4. The first light emission control signal is, for example, a signal which includes a series of a plurality of signals for defining a light emission pattern of the LEDs 4 for a predetermined length of time (for example 300 [msec]) started from the timing of the beat detection signal (hereinafter, this light emission pattern is referred to as a short pattern). The short pattern is a predefined emission pattern, in the other words.

The second light emission control signal is, for example, a signal for defining a light emission pattern of the LEDs 4, which is synchronized with a timing signal produced from a clock signal of a system (hereinafter, this light emission pattern is referred to as animation). In the memory, plural kinds of short patterns and one animation are stored in advance. The kinds of short patterns and an order in which the short patterns are played are predetermined in such a way that the display is performed attractively when the display is changed in synchronism with the beats of the music being reproduced. For example, first light emission control signals for display operations suitable respectively for reproductions of kinds of music such as Rock, Latin, Reggae, Fusion Music, etc. are generated and stored. It may be so configured that one or both of the first and second light emission control signals can be generated by a user as the user prefers.

The control unit 2 is provided with a system controller 5 for controlling a system. The system controller 5 is configured to carry out a plurality of functions by running a program, for example, stored in a ROM, and thereby to generate control signals for controlling sections of the sound reproduction device. Furthermore, the system controller 5 is configured to receive various operation signals via a user interface (such as key switches or a touch panel) (not illustrated).

The light emission control signal outputted from the LED controller 23 is supplied to the LEDs 4, which are a plurality of LEDs, and the LEDs 4 change their brightness according to the light emission control signal. The LEDs 4 are not limited to LEDs for emitting a single color, and may be configured to emit a plurality of colors. In case where the LEDs 4 are configured to emit a plurality of colors, the LEDs 4 may be configured to switch over the plurality of colors.

Figure 2:
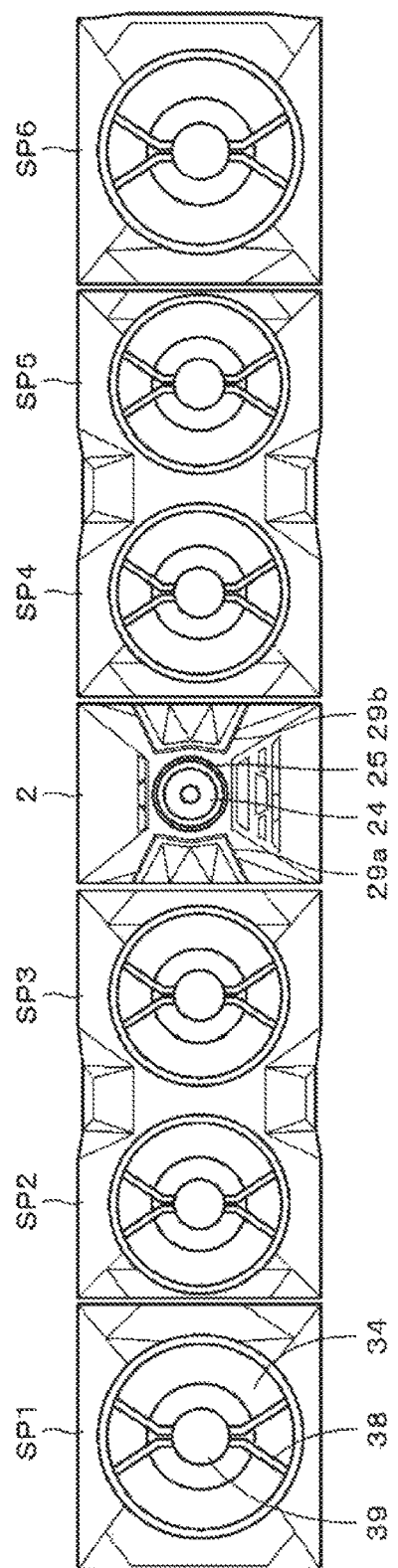
FIG. 2 is a front view illustrating an outer appearance according to one embodiment of the present disclosure.

A sound reproduction device according to one embodiment of the present disclosure has an outer appearance as illustrated in FIG. 2. Six speakers SP1 to SP6 serving as the speakers 3 are aligned laterally in a line. At a center of the speaker's array (that is, between the speakers SP3 and SP4), the control unit 2 is provided. The speaker SP1 and the SP6 are speakers for low frequency sound reproduction. The speakers SP2 and SP3 are connected to an enclosure commonly. The speakers SP4 and SP5 are connected to an enclosure commonly. The speakers SP2 to SP4 are speakers for medium to high frequency sound reproduction.

Figure 3:
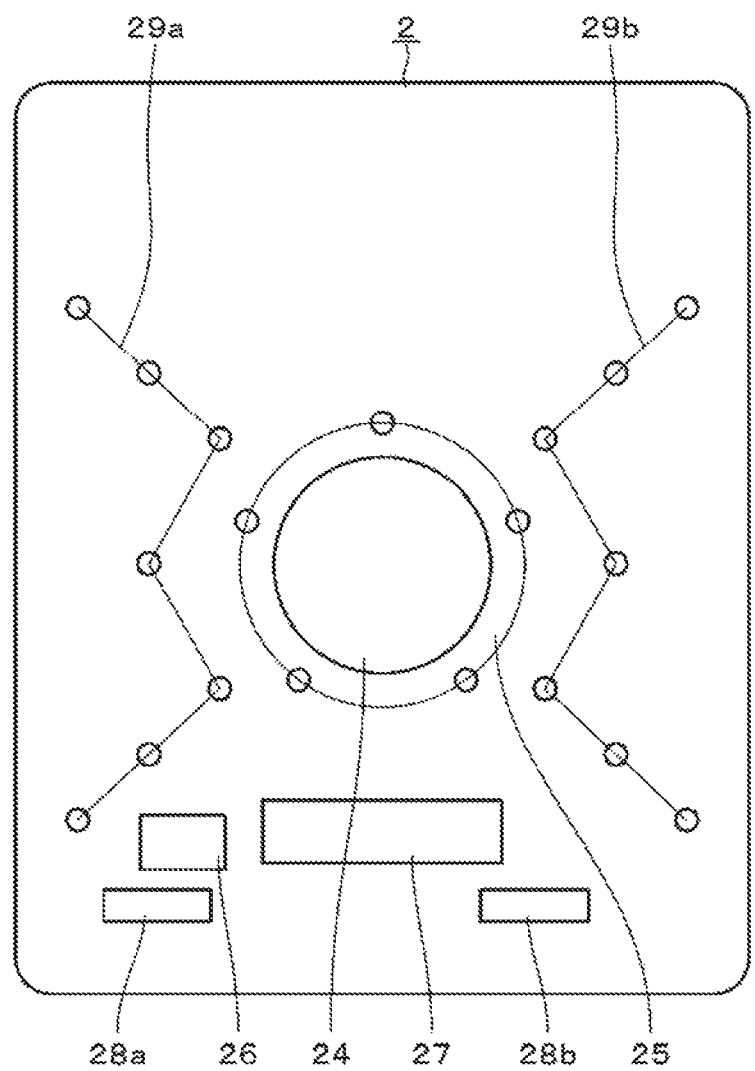
FIG. 3 is a front view illustrating one example of a control unit according to one embodiment of the present disclosure.

As illustrated in FIG. 3, in a center section of a front panel of the control unit 2, a sound volume adjusting knob 24 is provided. Along an outer periphery of the sound volume adjusting knob 24, a ring-shaped light emission section 25 is provided. The ring-shaped light emission section 25 includes a plurality of LEDs and a light guide(s). Furthermore, on the front panel, provided are a power switch 26, a bass boost switch 27, an USB memory attaching sections 28a and 28b, etc. In either regions on right and left sides of the sound volume adjusting knob 24, W-shaped light emission sections 29a and 29b are provided. The light emission sections 29a and 29b include a plurality of LEDs and a light guide(s).

Figure 4:
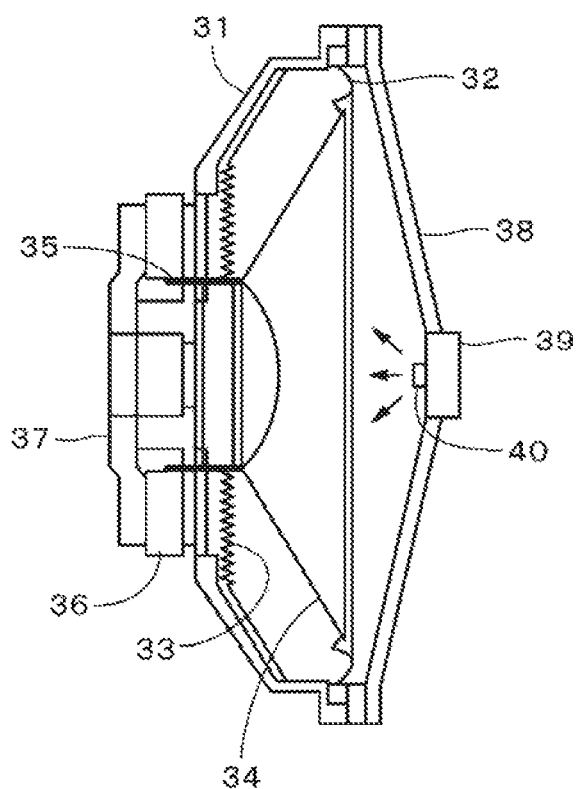
FIG. 4 is a schematic diagram illustrating a configuration of a speaker according to one embodiment of the present disclosure.

The speakers SP1 to SP6 are, for example, outer-magnet type dynamic speakers. The speaker SP1 has a configuration as illustrated in FIG. 4. The explanation herein will be made based on the speaker SP1. The other speakers SP2 to SP6 also have a configuration similar to that of the speaker SP1. As illustrated in FIG. 4, a vibration plate (cone paper) 34 is provided to a frame 31 via an edge 32 and a damper 33. On a base portion of the vibration plate 34, a voice coil 35 is provided. The voice coil 35 is positioned into a magnetic gap formed by a ring magnet 36 and a yoke 37. The voice coil 35 moves according to a music signal, thereby vibrating the vibration plate 34 so as to reproduce music.

A front frame 38, which includes two arms crossing each other to form an X shape, is provided in the front of the speaker. An LED 40 is provided at a position being located on a reverse surface of a plate 39 and being corresponded to at an intersection portion of the front frame 38. The LED 40 is so arranged that the LED 40 emits light onto the vibration plate 34 from the front. The vibration plate 34 is made from a material mixed with a highly reflective material such as mica, thereby having a high reflectivity. With this configuration, the light from the LED 40 is reflected from the vibration plate 34 toward the front, thereby displaying the speaker brightly. As described above, the LED 40 may be a signal color light source, which is configured to emit light of a single color such as white, blue, red, green, or the other color, or may be a multicolor light source, which is configured to selectively emit light of a color selected from among plural ones of these colors. The LED 40 may be replaced with a light emitting element other than LED.

Figure 5:
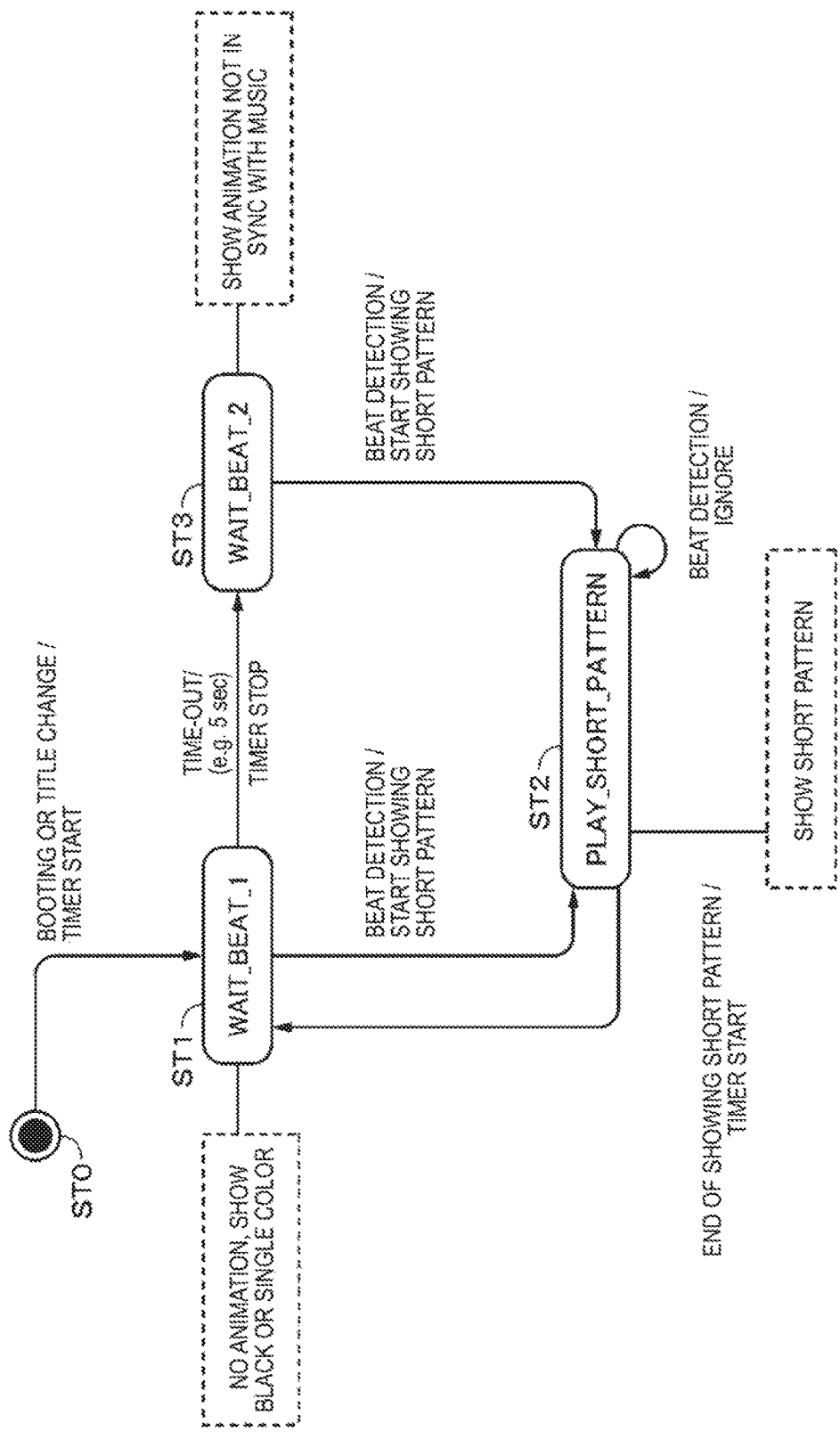
FIG. 5 is a schematic diagram for explaining a process according to one embodiment of the present disclosure.

How to control a display operation according to one embodiment of the present disclosure is described herein referring to FIG. 5. FIG. 5 illustrates state shifts. The display operation is controlled by the system controller 5 provided to the control unit 2. Each state is as follows.

State ST0: This is a starting state. The state changes start from State ST0 initially.

State ST1: This is a state waiting for beat detection. In this state, the LEDs 4 do not emit light or the LEDs 4 display a single color. That is, this is a state in which no dynamic light emission is being performed. No animation is displayed.

State ST2: This is a state, in which a predetermined short pattern is reproduced in synchronism with the beat detection signal. In this state, a short pattern is shown.

State ST3: This is a state waiting for beat detection. Unlike State ST1, dynamic light emission is being performed in State ST3. For example, animation not in synchronism with music is shown.

Furthermore, a control operation is described referring to FIG. 5. When a power is turned on (booted) or music is changed to another title in State ST0, a timer is started, and the control is shifted to State ST1. In State ST1, all of the LEDs perform no light emission or perform single-color light emission until a beat is detected. Meanwhile, no animation is performed in State ST1.

In State ST1, if a beat is detected within a predetermined length of time (for example, 5 [sec]) from the start of the timer, the control is shifted to State ST2, and showing of the short pattern is started. When the showing of one short pattern is ended, the timer is started, and the state shifts back to State ST1. If a new beat is detected during the showing of a short pattern, the beat is ignored.

If a period in which no beats are detected exceeds a predetermined length of time in State ST1, the timer is stopped and the control shifts to State ST3. State ST3 is a state waiting for beat detection, and animation not in synchronism with music is shown in State ST3. When a beat is detected in State ST3, showing of a short pattern is started and the control is shifted to State ST2.

Figure 6A:
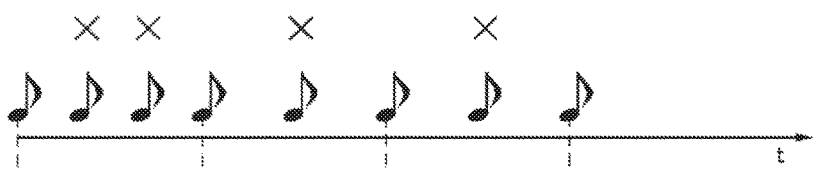
FIGS. 6A and 6B are timing chart for explaining a process according to one embodiment of the present disclosure.
Figure 6B:
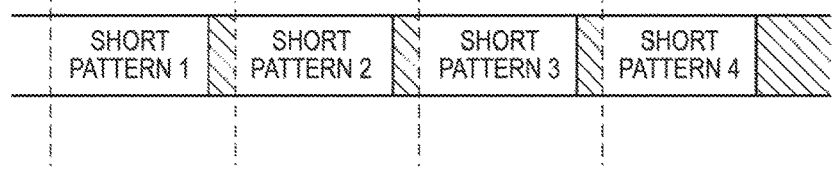

In State ST2, showing of the short pattern is carried out as illustrated in FIGS. 6A and 6B. FIG. 6A illustrates the beats detected. Herein, the beats are schematically illustrated but the beat signals are pulse signals serving as a reference for timing. FIG. 6B illustrates short patterns shown. A short pattern 1 is shown in synchronism with the beats. And a short pattern 2 is shown in synchronism with next beats. Display periods of the short patterns 1, 2 . . . are substantially equal to each other, for example, 300 [msec]. A period intervening between a period of a short pattern and a period of a next beat is a period in which no light emission or single color light emission is performed as indicated by diagonal lines. After the short pattern is started, the timer is started. For example, if no beats are detected for 5 [sec] or longer, it times out and the control is shifted to State ST3.

The beats detected in the period of showing of each short pattern are ignored, as indicated by the cross-out markings. This is to avoid such a problem in that the effect of the display cannot be obtained because the short patterns are switched over within too short time. Preferably, the length of time for the short patterns are set based on general features of music to be reproduced. This is because beats shorter than 300 [msec] are relatively rare. Note that the display of the animation in State ST3 will be described later.

"Specific Example of Short Patterns"

Figure 7:
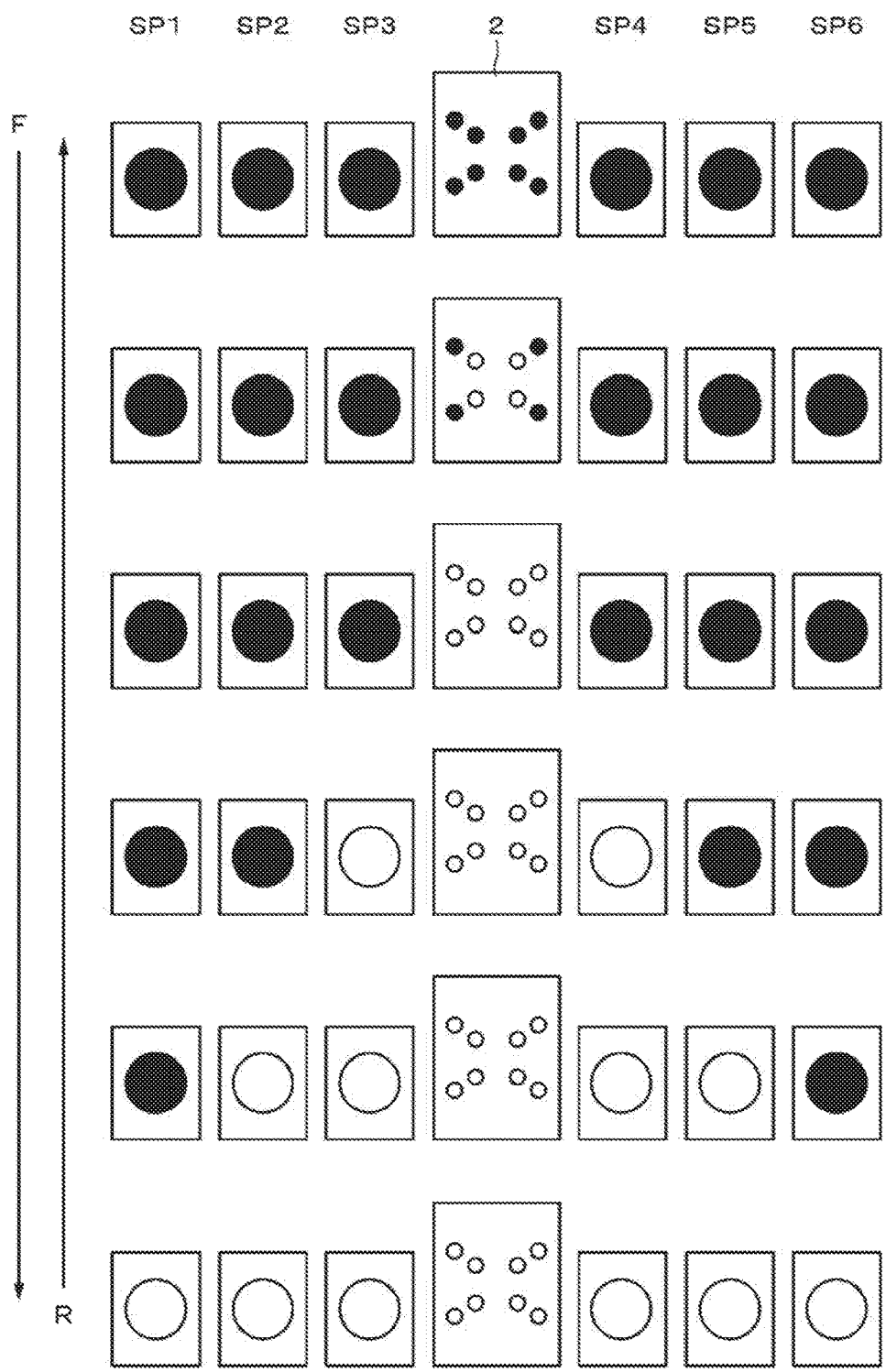
FIG. 7 is a schematic diagram illustrating a first example of a short pattern.

First to sixth examples of short patterns are explained herein, referring to FIGS. 7 to 12. In FIG. 7, the light emission is changed along the direction of Arrow F. Here, in the first 3 light emission patterns, the LEDs of the respective speakers SP1 to SP6 are in the state of performing no light emission (indicated by filled circle) and the number of LEDs turned on to emit light in the W-shaped light emission sections (see FIGS. 2 and 3) of the control unit 2 is increased gradually. After all the LEDs in the W-shaped light emission sections are turned on to emit light, the number of LEDs turned on to emit light in the speaker SP1 to SP6 is increased gradually. More specifically, the LEDs of the speakers SP3 and SP4 adjacent to the control unit 2 are turned on to emit light, and then the LEDs of the speakers SP2 to SP5 are turned on to emit light, and finally, the LEDs of the speakers SP1 to SP6 are turned on to emit light. After the change along the direction of Arrow F comes to the end, the change is reversed as indicated by Arrow R. The changes along Arrows F and R are carried out with an interval of, for example, 300 [msec] therebetween.

Figure 8:
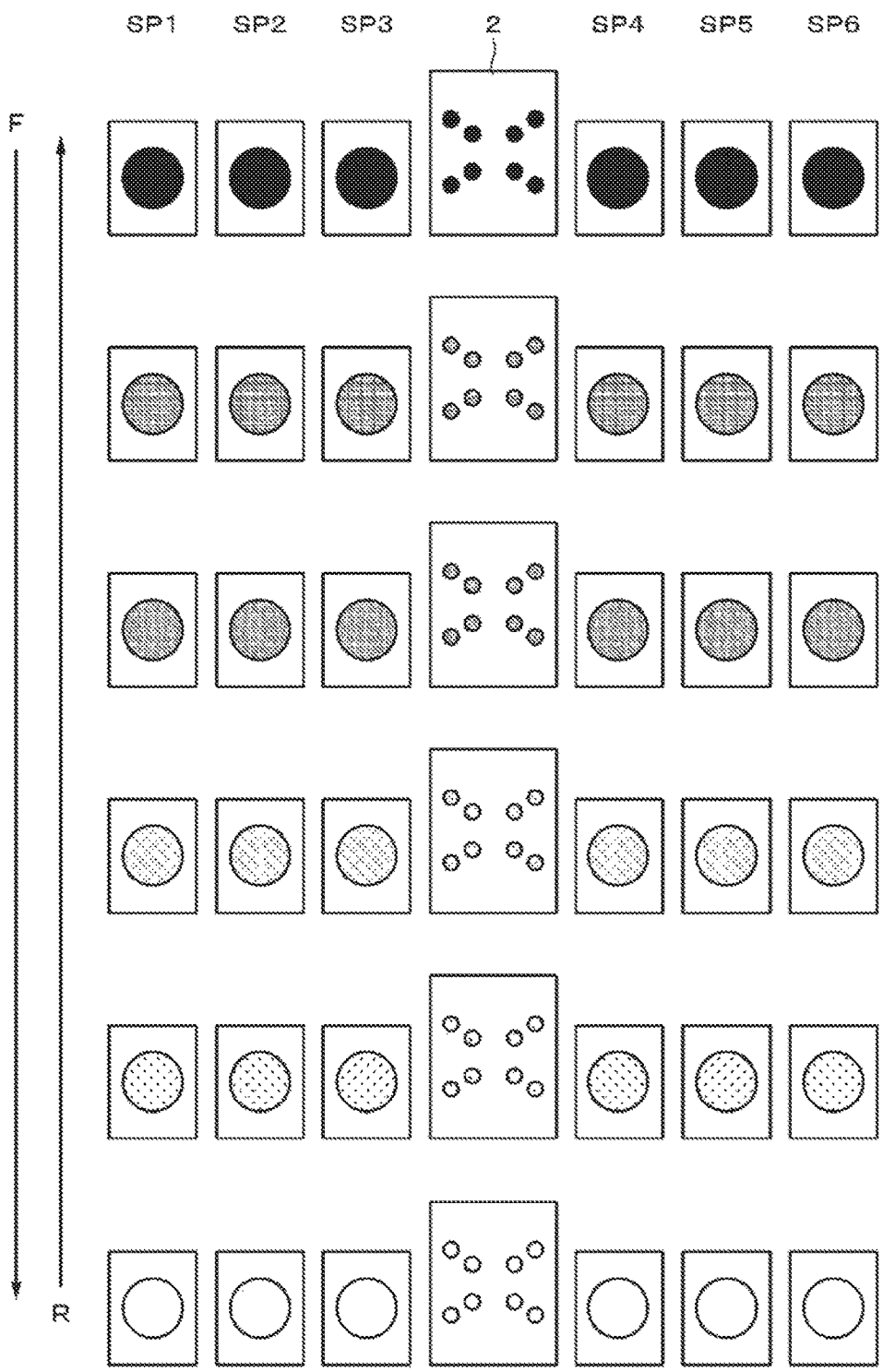
FIG. 8 is a schematic diagram illustrating a second example of a short pattern.

The short pattern as illustrated in FIG. 8 is such that it starts from a state in which all the LEDs of the control unit 2 and the speakers do not emit light. Subsequently, each LED is gradually brightened in the direction of Arrow F until all the LEDs are turned on. Next, an opposite change is made in the direction of Arrow R (so that each LED is gradually darkened).

Figure 9:
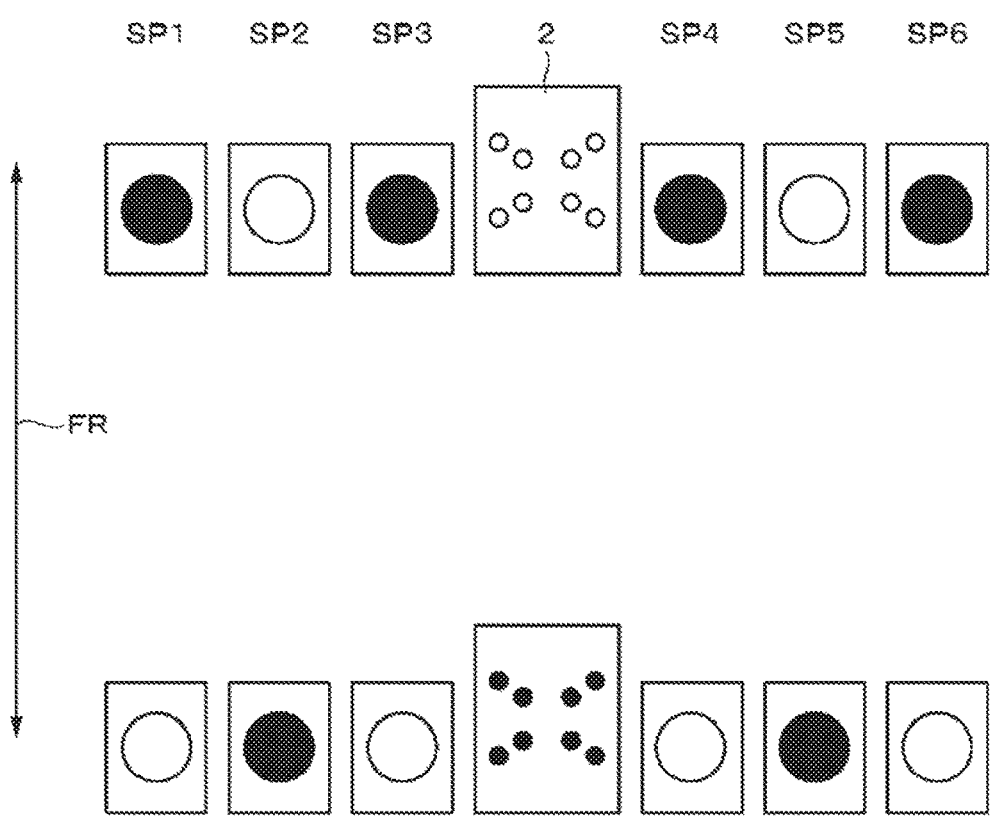
FIG. 9 is a schematic diagram illustrating a third example of a short pattern.

The short pattern as illustrated in FIG. 9 is such that opposite-phased light emission patterns are repeated alternatively as indicated by Arrows F and R. That is, one of the light emission pattern is such that (SP1: no light emission, SP2: light emission, SP3: no light emission, W-shaped light emission section: light emission, SP4: no light emission, SP5: light emission, SP6: no light emission). The other and next pattern of the light emission is such that (SP1: light emission, SP2: no light emission, SP3: light emission, W-shaped light emission section: no light emission, SP4: light emission, SP5: no light emission, SP6: light emission). The light emission pattern may be repeated one or more times.

Figure 10:
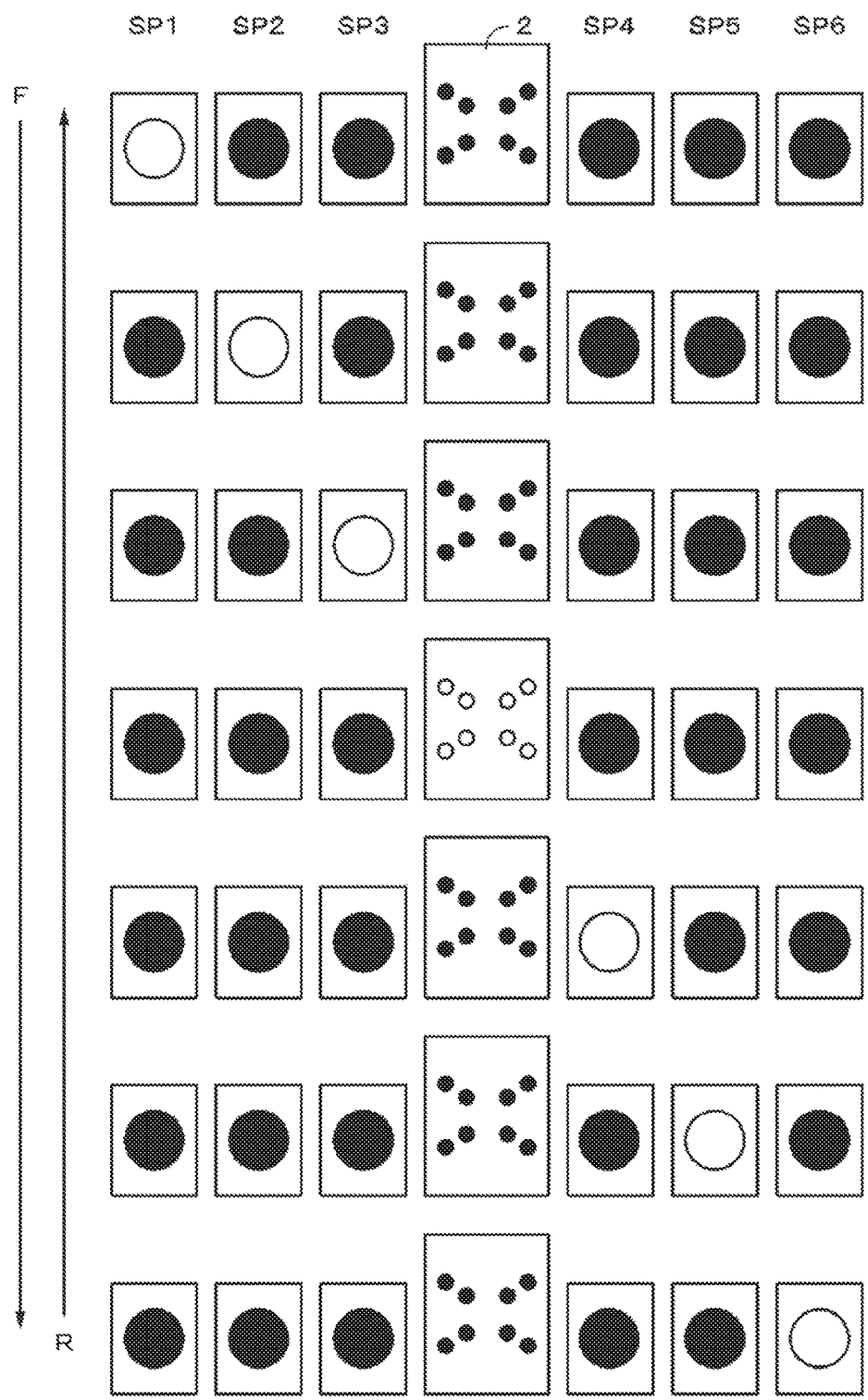
FIG. 10 is a schematic diagram illustrating a fourth example of a short pattern.

The short pattern as illustrated in FIG. 10 is such that the LEDs of the totally seven components, namely the speakers SP1 to SP6 and the control unit 2 laterally aligned are turned on and off in such a manner that an LED, which is turned on among the LEDs, is shifted in a lateral direction sequentially. In the direction indicated by Arrow F, the position of the turned-on LED is shifted from the left to right of the drawing. In the direction indicated by Arrow R, the position of the turned-on LED is shifted from the right to left of the drawing.

Figure 11:
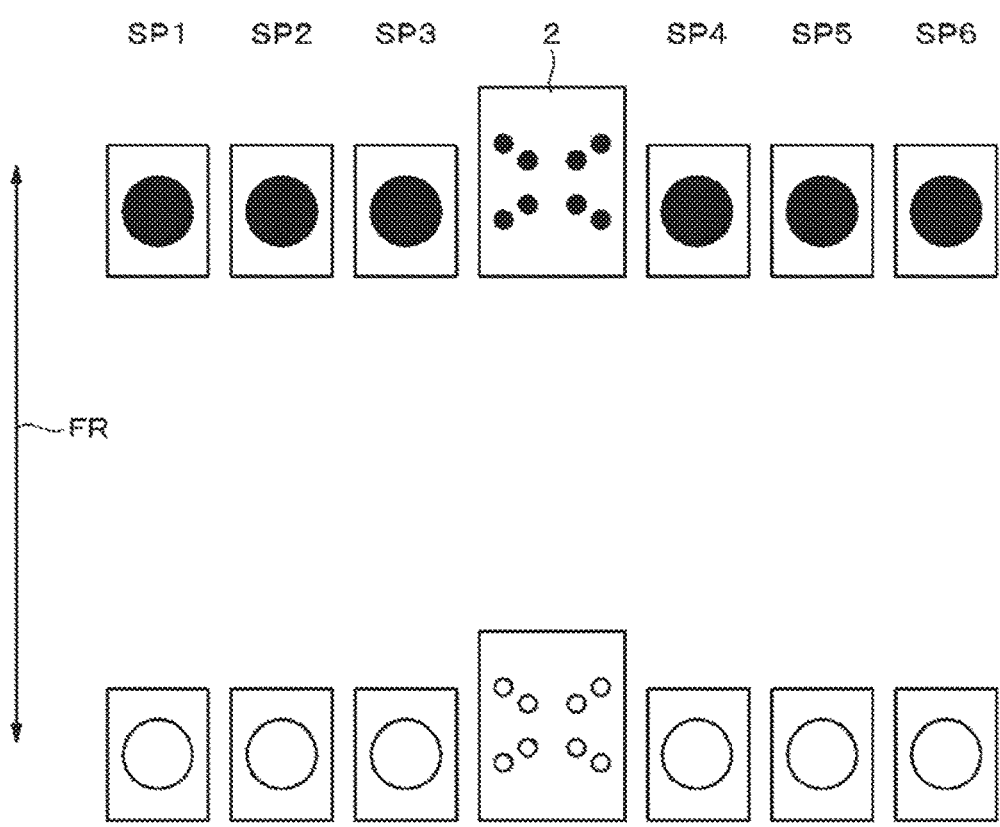
FIG. 11 is a schematic diagram illustrating a fifth example of a short pattern.

The short pattern as illustrated in FIG. 11 is such that the LEDs of the totally seven components, namely the speakers SP1 to SP6 and the control unit 2 laterally aligned are turned on and off in such a manner that the whole LEDs turned on and off in chorus alternatively, as indicated by the Arrows F and R. The number of repeating may be one or more.

Figure 12:
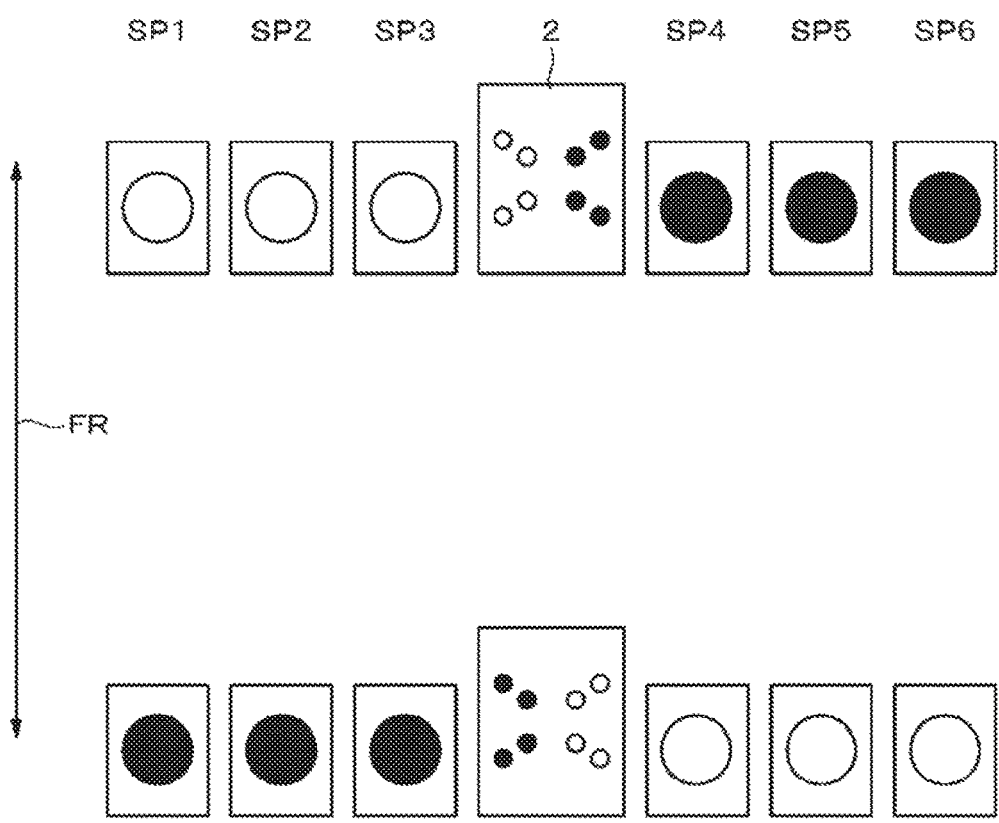
FIG. 12 is a schematic diagram illustrating a sixth example of a short pattern.

The short pattern as illustrated in FIG. 12 is such that light emission patterns of spatially opposite phases are repeated alternatively, as indicated by Arrows F and R. The number of repeating may be one or more. That is, one of the light emission pattern is such that (SP1: light emission, SP2: light emission, SP3: light emission, W-shaped light emission section: light emission, SP4: no light emission, SP5: no light emission, SP6: no light emission). The other and next pattern of the light emission is such that (SP1: no light emission, SP2: no light emission, SP3: no light emission, W-shaped light emission section: no light emission, SP4: light emission, SP5: light emission, SP6: light emission).

"Example of Animation"

Figure 13:
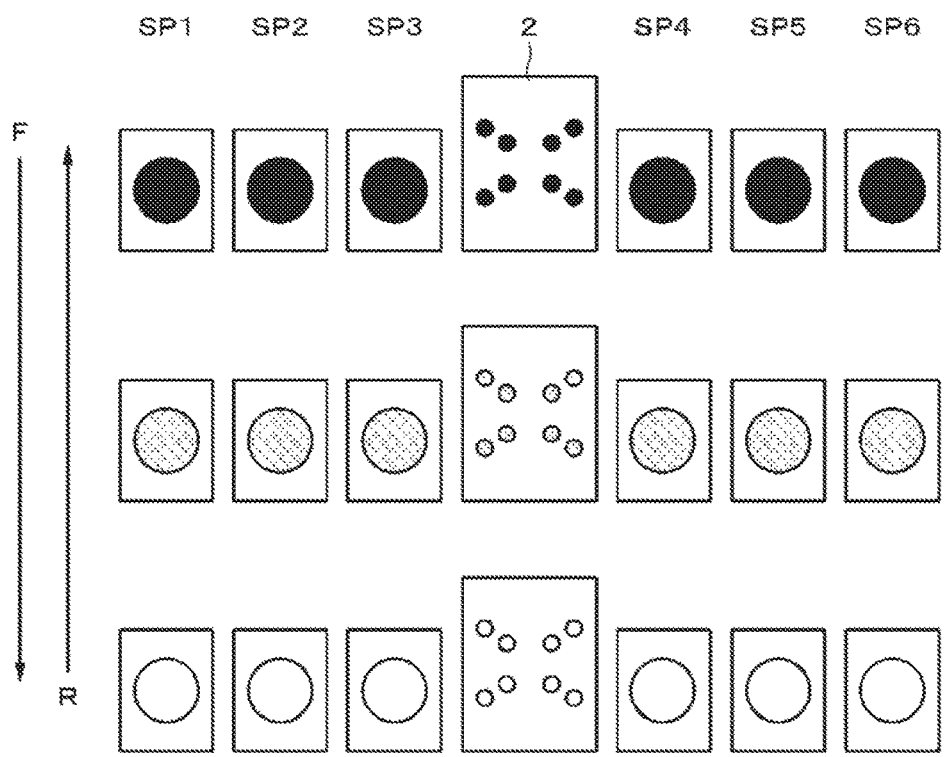
FIG. 13 is a schematic diagram illustrating one example of animation.
Figure 14:
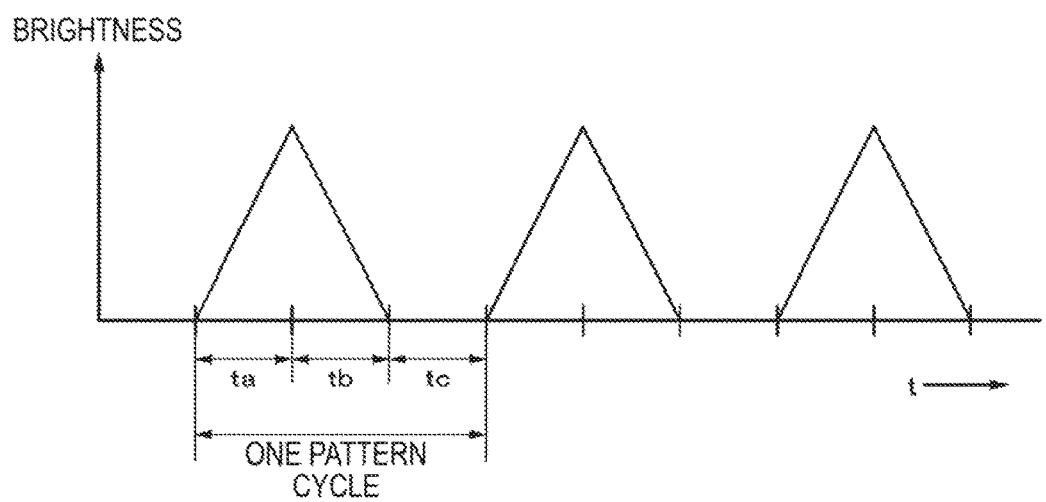
FIG. 14 is a timing chart for explaining animation.

Referring to FIGS. 13 and 14, one example of animation shown in State ST3. The animation starts from non-light emission pattern, in which all the LEDs of the totally seven components, namely the speakers SP1 to SP6 and the control unit 2 are turned off. Then, as indicated by Arrow F, each LED gets brighter gradually until each LED emits light at maximum brightness. After that, as indicated by Arrow R, each LED gets darker gradually until each LED fall into a state that the LED emits no light. The animation repeats these changes.

As illustrated in FIG. 14, the animation is such that all the LEDs increase their brightness gradually in a period ta until the brightness reaches maximum brightness, and then all the LEDs decrease their brightness gradually in a period tb until the brightness reaches minimum brightness (no light emission). Then, in a period tc, all the LEDs fall in such a state that each LED emits no light. The animation is performed to repeat the changes by repeating the periods ta, tb, and tc. Because during the animation no beats are detected, the animation is performed in synchronism with a timing signal formed from a clock of a system.

Furthermore, the change in the brightness of the LEDs in the animation is slower than that in the short patterns, and the light emission pattern in the animation is so simple that the LEDs are switched over in chorus from a bright state and a dark state. One example of the animation is such that ta=2664 [msec], tb=2664 [msec], and tc=1332 [msec]. In this case, one cycle of the periods ta, tb, and tc is 6660 [msec] (6.66 [sec]). With such animation in which the changes of brightness of the LEDs are slow and the light emission pattern is so simple, it becomes possible to prevent such a case that display more than required is performed while no beats are detected. Furthermore, the animation thus shown makes it possible to prevent significant spoilage or elimination of excitement or a sense of exaltation obtained by changing the brightness of the LEDs while beats are detected. As described above, the present disclosure makes it possible to perform such illumination that dynamic expression can be expressed by changing brightness of light, and when music is quite and has a part having no beats, such illumination that will not spoil overall mode of the music is performed. That is, the present disclosure makes it possible to perform such good-mood illumination that is performed as if a person is controlling the illumination on site.

2. Modifications

In the explanation above, the plurality of speakers are arranged in a horizontal direction, but the present disclosure is also applicable to a case where a plurality of speakers are arranged in a vertical direction. Furthermore, the present disclosure is also applicable to a sound reproduction device for which a plurality of speakers for sound reproduction are positioned independently. Furthermore, the light emitting elements may be an element other than an LED. Moreover, the supply of the audio signal to the speaker(s), and/or the supply of the signal for driving the LEDs may be performed by wireless communication.

The embodiments of the present disclosure have been described specifically. However, embodiments of the present disclosure are not limited to the above-described embodiment, but may be modified in various ways based on the technical sprit and essence of the present disclosure. For example, the configurations, the methods, the processes, the shapes, the materials, the numerical values, and the like mentioned in the above-described embodiments are merely examples. Different configurations, methods, processes, shapes, materials, numerical values, and the like may be used, as necessary.

Additionally, the present technology may also be configured as below.

(1)
A sound reproduction device including:
a plurality of speakers;
a plurality of light emitting elements provided to a part of each of the speakers, or in a vicinity of each of the speakers;
a detecting section configured to detect a beat of an audio signal reproduced by the speakers, and output a detection signal corresponding to the beat; and
a light emission control signal outputting section configured to output a light emission control signal for controlling a light emission mode of the light emitting elements according to the detection signal,
wherein the light emission control signal outputting section outputs a first light emission control signal according to the detection signal, and outputs a second light emission control signal when a period in which the beat is not detected exceeds a set period, the second light emission control signal being for controlling the light emitting elements to perform a predetermined light emission mode.

(2)
The sound reproduction device according to (1), wherein the plurality of speakers are arranged in a horizontal or vertical direction.

(3)
The sound reproduction device according to any of (1) and (2), wherein the light emitting elements emit light onto vibration plates of the speakers.

(4)
The sound reproduction device according to any of (1), (2), and (3), wherein the detecting section and the light emission control signal outputting section are integrated as a control unit, and the control unit is provided with a light emitting element for emitting light according to the detection signal.

(5)
The sound reproduction device according to any of (1), (2), (3), and (4), wherein the first light emission control signal is a signal for controlling a light emission mode in a predetermined period starting in synchronism with the detection signal.

(6)
The sound reproduction device according to any of (1), (2), (3), (4), and (5), wherein a beat detected in the predetermined period is ignored.

(7)
The sound reproduction device according to any of (1), (2), (3), (4), (5), and (6), wherein there are a plurality of kinds of light emission modes in the predetermined period, and an order of the light emission modes in the predetermined period is set in advance.

(8)
The sound reproduction device according to any of (1), (2), (3), (4), (5), (6), and (7), wherein the second light emission control signal changes a light emission mode of the light emitting elements in a certain cycle.

(9)
The sound reproduction device according to any of (1), (2), (3), (4), (5), (6), (7), and (8), wherein the cycle is longer than the predetermined period.

(10)
The sound reproduction device according to any of (1), (2), (3), (4), (5), (6), (7), (8), and (9), wherein the light emission mode is simpler than the light emission mode in the predetermined period.

REFERENCE SIGNS LIST

SP1 to SP6 speakers
ST0, ST1, ST2, and ST3 states
1 sound source
2 control unit
3 speaker
4 LED
5 system controller
21 signal processing section
23 LED controller
29a, 29b W-shaped light emitting sections
34 vibration plate
40 LED

The invention claimed is:

1. A sound reproduction device comprising:
a speaker;
at least one light emitting element one of on a part of the speaker or in a vicinity of the speaker;
a detecting section configured to:
detect a first beat of an audio signal reproduced by the speaker, and
output a detection signal corresponding to the first beat; and
a light emission control signal outputting section configured to:
output a first light emission control signal that controls a light emission mode of the at least one light emitting element according to the detection signal,
wherein the first light emission control signal controls the at least one light emitting element to emit light in a determined pattern for a determined period that starts in synchronism with the detection signal;
wait for the determined period before the determined pattern is changed based on a second beat detected by the detecting section; and
output a second light emission control signal in case a time period in which a beat is not detected exceeds a set period, wherein the second light emission control signal controls the at least one light emitting element to emit the light in a determined light emission mode.

2. The sound reproduction device according to claim 1, further comprising a plurality of speakers including the speaker, wherein the speaker is arranged in a horizontal or vertical direction with other speakers of the plurality of speakers.

3. The sound reproduction device according to claim 1, wherein the at least one light emitting element is configured to emit light onto a vibration plate of the speaker, wherein the vibration plate includes a reflective surface configured to reflect the light from the at least one light emitting element.

4. The sound reproduction device according to claim 1, wherein the detecting section and the light emission control signal outputting section are integrated as a control unit, and the control unit is provided with the light emitting element for emission of the light according to the detection signal.

5. The sound reproduction device according to claim 1, further comprising a plurality of light emission modes in the determined period, wherein an order of the plurality of light emission modes in the determined period is set in advance.

6. The sound reproduction device according to claim 1, wherein the second light emission control signal changes the determined light emission mode of the at least one light emitting element in a certain cycle.

7. The sound reproduction device according to claim 6, wherein the certain cycle is longer than the determined period.

8. The sound reproduction device according to claim 6, wherein the determined light emission mode is simpler than the light emission mode in the determined period.

9. A sound reproduction device comprising:
a speaker;
at least one light emitting element one of on a part of the speaker or in a vicinity of the speaker,
wherein the at least one light emitting element is configured to emit light onto a vibration plate of the speaker, wherein the vibration plate includes a reflective surface configured to reflect the light from the at least one light emitting element;
a detecting section configured to:
   detect a beat of an audio signal reproduced by the speaker, and
   output a detection signal corresponding to the beat; and
a light emission control signal outputting section configured to:
   output a first light emission control signal that controls a light emission mode of the at least one light emitting element according to the detection signal; and
   output a second light emission control signal in case a time period in which the beat is not detected exceeds a set period, wherein the second light emission control signal controls the at least one light emitting element to emit the light in a determined light emission mode.

* * * * *